United States Patent
Takahashi et al.

(10) Patent No.: US 9,198,102 B2
(45) Date of Patent: Nov. 24, 2015

(54) MOBILE COMMUNICATION METHOD

(71) Applicant: NTT DOCOMO, INC., Tokyo (JP)

(72) Inventors: Hideaki Takahashi, Tokyo (JP); Wuri Andarmawanti Hapsari, Tokyo (JP); Kenichiro Aoyagi, Tokyo (JP); Takayuki Watanabe, Tokyo (JP); Tatsuro Yajima, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 14/431,244

(22) PCT Filed: Sep. 20, 2013

(86) PCT No.: PCT/JP2013/075532
§ 371 (c)(1),
(2) Date: Mar. 25, 2015

(87) PCT Pub. No.: WO2014/050755
PCT Pub. Date: Apr. 3, 2014

(65) Prior Publication Data
US 2015/0249944 A1 Sep. 3, 2015

(30) Foreign Application Priority Data
Sep. 26, 2012 (JP) ................. 2012-212961

(51) Int. Cl.
*H04W 4/00* (2009.01)
*H04W 36/08* (2009.01)
*H04W 36/00* (2009.01)

(52) U.S. Cl.
CPC .......... *H04W 36/08* (2013.01); *H04W 36/0005* (2013.01)

(58) Field of Classification Search
CPC .......................... H04W 36/08; H04W 36/0005
See application file for complete search history.

(56) References Cited

U.S. PATENT DOCUMENTS

| | | | | |
|---|---|---|---|---|
| 2007/0171875 A1* | 7/2007 | Suda | ...................... | H04W 36/02 370/333 |
| 2009/0318144 A1* | 12/2009 | Thomas | ................ | H04W 48/20 455/434 |
| 2010/0067484 A1* | 3/2010 | Kagimoto | ............... | H04W 4/20 370/331 |

(Continued)

FOREIGN PATENT DOCUMENTS

| | | |
|---|---|---|
| JP | 2010-233144 A | 10/2010 |
| JP | 2011-010201 A | 1/2011 |
| JP | 2012-126138 A | 7/2012 |

OTHER PUBLICATIONS

International Search Report issued in PCT/JP2013/075532 mailed Dec. 17, 2013 (2 pages).

(Continued)

*Primary Examiner* — Clemence Han
(74) *Attorney, Agent, or Firm* — Osha Liang LLP (57) ABSTRACT

A mobile communication method includes: a step of transmitting, by a radio base station eNB#3, "Forwarding Request" on downlink user data addressed to a mobile station UE to a radio base station eNB#1; a step of switching, in response to the "Forwarding Request", by the radio base station eNB#1, a forwarding destination of the downlink user data addressed to the mobile station UE from the radio base station eNB#2 to the radio base station eNB#3; and a step of transmitting, by the radio base station eNB#3, the downlink user data addressed to the mobile station UE to the mobile station UE.

4 Claims, 6 Drawing Sheets

(56) References Cited

U.S. PATENT DOCUMENTS

| | | | | |
|---|---|---|---|---|
| 2010/0248726 | A1* | 9/2010 | Kagimoto | H04W 36/02 455/437 |
| 2012/0263096 | A1* | 10/2012 | Masini | H04W 36/10 370/315 |
| 2013/0242941 | A1* | 9/2013 | Ebesu | H04W 36/245 370/331 |
| 2014/0206354 | A1* | 7/2014 | Yasuoka | H04B 7/15 455/436 |
| 2015/0078342 | A1* | 3/2015 | Chen | H04W 76/00 370/331 |

OTHER PUBLICATIONS

Written Opinion of the International Searching Authority issued in PCT/JP2013/075532 mailed on Dec. 17, 2013 (4 pages).

3GPP TS 36.300 V11.2.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)"; Jun. 2012 (201 pages).

3GPP TS 36.413 V11.0.0; "3rd Generation Partnership Project; Technical Specification Group Radio Access Network; Evolved Universal Terrestrial Radio Access Network (E-UTRAN); S1 Application Protocol (S1AP) (Release 11)"; Jun. 2012 (258 pages).

3GPP TS 36.423 V11.2.0; "3rd Generation Partnership Project; Technical Specification Group Radio Access Network; Evolved Universal Terrestrial Radio Access Network (E-UTRAN); X2 Application protocol (X1AP) (Release 11)"; Sep. 2012 (136 pages).

* cited by examiner

X2 Handover Request

| IE/Group Name | Presence | Range | IE type and reference | Semantics description | Criticality | Assigned Criticality |
|---|---|---|---|---|---|---|
| Message Type | M | | 9.2.13 | | YES | reject |
| Old eNB UE X2AP ID | M | | eNB UE X2AP ID 9.2.24 | Allocated at the source eNB | YES | reject |
| Cause | M | | 9.2.6 | | YES | ignore |
| Target Cell ID | M | | ECGI 9.2.14 | | YES | reject |
| GUMMEI | M | | 9.2.16 | | YES | reject |
| UE Context Information | | 1 | | | YES | reject |
| >MME UE S1AP ID | M | | INTEGER (0..2^32-1) | MME UE S1AP ID allocated at the MME | – | – |
| >UE Security Capabilities | M | | 9.2.29 | | – | – |
| >AS Security Information | M | | 9.2.30 | | – | – |
| >UE Aggregate Maximum Bit Rate | M | | 9.2.12 | | – | – |
| >Subscriber Profile ID for RAT/Frequency priority | O | | 9.2.25 | | – | – |
| >E-RABs To Be Setup List | | 1 | | | EACH | ignore |
| >>E-RABs To Be Setup Item | | 1 .. <maxnoof Bearers> | | | – | – |
| >>>E-RAB ID | M | | 9.2.23 | | – | – |
| >>>E-RAB Level QoS Parameters | M | | 9.2.9 | Includes necessary QoS parameters | – | – |
| >>>DL Forwarding | O | | 9.2.5 | | – | – |
| >>>UL GTP Tunnel Endpoint | M | | GTP Tunnel Endpoint 9.2.1 | SGW endpoint of the S1 transport bearer. For delivery of UL PDUs. | – | – |
| >RRC Context | M | | OCTET STRING | Includes the RRC Handover Preparation Information message as defined in subclause 10.2.2 of TS 36.331 [9]. | – | – |
| >Handover Restriction List | O | | 9.2.3 | | – | – |
| >Location Reporting Information | O | | 9.2.21 | Includes the necessary parameters for location reporting | – | – |
| >Management Based MDT Allowed | O | | 9.2.59 | | YES | ignore |
| UE History Information | M | | 9.2.38 | Same definition as in TS 36.413 [4]. | YES | ignore |
| Trace Activation | O | | 9.2.2 | | YES | ignore |
| SRVCC Operation Possible | O | | 9.2.33 | | YES | ignore |
| CSG Status | O | | 9.2.52 | | YES | reject |
| Anchor eNB ID | O | | Global eNB ID 9.2.22 | eNB RELAYING U-plane BETWEEN eNBs THROUGH WHICH MME AND UE ARE CONNECTED | YES | ignore |

Forwarding Request

| IE/Group Name | Presence | Range | IE type and reference | Semantics description | Criticality | Assigned Criticality |
|---|---|---|---|---|---|---|
| Message Type | M | | 9.2.13 | | YES | reject |
| Old eNB UE X2AP ID | M | | eNB UE X2AP ID 9.2.24 | Allocated at the source eNB (eNB #2) | YES | ignore |
| New eNB UE X2AP ID | M | | eNB UE X2AP ID 9.2.24 | Allocated at the target eNB (eNB #3) | YES | ignore |
| E-RABs Admitted List | | 1 | | | YES | ignore |
| > E-RABs Admitted Item | | 1 .. <maxnoof Bearers> | | | EACH | ignore |
| >> E-RAB ID | M | | 9.2.23 | | – | – |
| >> UL GTP Tunnel Endpoint | O | | GTP Tunnel Endpoint 9.2.1 | Identifies the X2 transport bearer used for forwarding of UL PDUs | – | – |
| >> DL GTP Tunnel Endpoint | O | | GTP Tunnel Endpoint 9.2.1 | Identifies the X2 transport bearer. used for forwarding of DL PDUs | – | – |
| E-RABs Not Admitted List | O | | E-RAB List 9.2.28 | a value for E-RAB ID shall only be present once in E-RABs Admitted List IE + in E-RABs Not Admitted List IE | YES | ignore |
| Criticality Diagnostics | O | | 9.2.7 | | YES | ignore |

Forwarding Response

| IE/Group Name | Presence | Range | IE type and reference | Semantics description | Criticality | Assigned Criticality |
|---|---|---|---|---|---|---|
| Message Type | M | | 9.2.13 | | YES | ignore |
| New Anchor eNB UE X2AP ID | O | | eNB_UE_X2AP_ID 9.2.24 | Allocated at the target eNB | YES | ignore |
| >E-RABs To Be Forwarded List | | 1 | | | – | – |
| >>E-RABs To Be Forwarded Item | | 1..<maxnoof Bearers> | | | EACH | ignore |
| >>>E-RAB ID | M | | 9.2.23 | | – | – |
| >>>UL GTP Tunnel Endpoint | M | | GTP Tunnel Endpoint 9.2.1 | Identifies the X2 transport bearer used for forwarding of UL PDUs via anchor eNB | | |
| Criticality Diagnostics | O | | 9.2.7 | | YES | ignore |

MOBILE COMMUNICATION METHOD

TECHNICAL FIELD

The present invention relates to a mobile communication method.

BACKGROUND ART

LTE (Long Term Evolution) is configured such that "Path Switch" is performed between a radio base station eNB and a mobility management node MME (Mobility Management Entity) when X2 handover processing is performed for a mobile station UE.

PRIOR ART DOCUMENT

Patent Document

Patent document 1: Japanese Patent Application No. 2012-126138

Non-Patent Documents

Non-patent document 1: 3GPP T536.300
Non-patent document 2: 3GPP T536.413
Non-patent document 3: 3GPP T536.423

SUMMARY OF THE INVENTION

In an operation possibly employable for reducing a signal load onto a mobility management node MME (core network), the above-described "Path Switch" is not preformed when X2 handover processing is performed.

In such an operation, in the X2 handover processing, handover target radio base station eNB does not transmit "(S1) Path Switch" to a mobility management node MME, and downlink user data (U-plane data) addressed to a mobile station UE is continuously forwarded to the handover target radio base station eNB through a handover source radio base station eNB.

Then, the mobility management node MME continuously transmits downlink user data (U-plane data) addressed to the mobile station UE to the handover source radio base station eNB even after the X2 handover processing is completed.

However, in a case where the above operation is performed, when after X2 handover processing is completed, the X2 handover processing is again performed to another radio base station eNB, the downlink user data (U-plane data) addressed to the mobile station UE is forwarded to the mobile station UE through the multiple radio base stations eNB. Thus, there is a problem of a high possibility that transmission of the downlink user data addressed to the mobile station UE may fail.

Accordingly, the present invention has been made with a view to the above problem, and an objective of the present invention is to provide a mobile communication method in which, in a case of executing an operation in which "Path Switch" is not performed when X2 handover processing is performed, downlink user data addressed to a mobile station is properly transmitted to the mobile station without an increase in the number of radio base stations through which the downlink user data is forwarded.

A first feature of the present invention is summarized as a mobile communication method, including the steps of: in a state where a first radio base station forwards downlink user data addressed to a mobile station, which is received from a gateway apparatus, to a second radio base station and the second radio base station transmits the downlink user data addressed to the mobile station to the mobile station, determining, by the second radio base station, to perform handover processing for the mobile station from a cell under the second radio base station to a cell under a third radio base station; transmitting, by the second radio base station, a handover request signal to the third radio base station, the handover request signal notifying that forwarding of the downlink user data addressed to the mobile station from the first radio base station to the second radio base station is ongoing; transmitting, by the third radio base station, a forwarding request signal for the downlink user data addressed to the mobile station, to the first radio base station; in response to the forwarding request signal, switching, by the first radio base station, a forwarding destination of the downlink user data addressed to the mobile station, which is received from the gateway apparatus, from the second radio base station to the third radio base station; and transmitting, by the third radio base station, the downlink user data addressed to the mobile station, which is received from the first radio base station, to the mobile station.

BRIEF DESCRIPTION OF THE DRAWINGS

FIG. 4 is a diagram illustrating one example of a format of "X2 Handover Request" which is used in the mobile communication system according to the first embodiment of the present invention.

DETAILED DESCRIPTION

Mobile Communication System According to the First Embodiment of the Present Invention A mobile communication system according to a first embodiment of the present invention will be described with reference to FIGS. 1 to 6.

Figure 1:
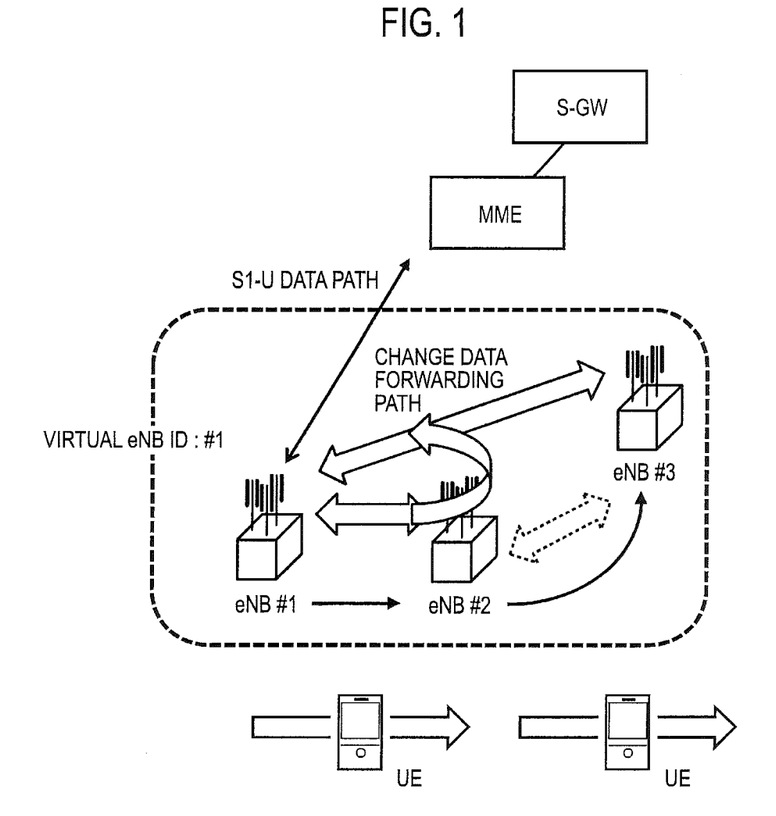
FIG. 1 is an entire configuration diagram of a mobile communication system according to a first embodiment of the present invention.

As illustrated in FIG. 1, the mobile communication system according to the present embodiment is an LTE mobile communication system, which includes a gateway apparatus S-GW (Serving-Gateway), a mobility management node MME, and radio base stations eNB#1 to eNB#3.

Here, the radio base stations eNB#1 to eNB#3 have "Virtual eNB ID#1." In other words, the radio base stations eNB#1 to eNB#3 belong to a same group.

Here, "Path Switch" is not required in X2 handover processing between cells under the radio base stations eNB having the same "Virtual eNB ID," in other words, in X2 handover processing between cells under radio base stations eNB belonging to a same group.

As illustrated in FIG. 1, the mobile communication system according to the present embodiment is configured such that a mobile station UE does not perform the "Path Switch" when the X2 handover processing is performed between a cell #1 under the radio base station eNB#1, a cell #2 under the radio base station eNB#2, and a cell #3 under the radio base station eNB#3.

Also, the mobile communication system according to the present embodiment is configured such that when the X2 handover processing from the cell #1 under the radio base station eNB#1 to the cell #2 under the radio base station eNB#2 is performed on the mobile station UE, a forwarding path of downlink user data is switched from a path of the gateway apparatus S-GW, the radio base station eNB#1, and the mobile station UE in this order to a path of the gateway apparatus S-GW, the radio base station eNB#1, the radio base station eNB#2, and the mobile station UE in this order, and a forwarding path of uplink user data is switched from a path of the mobile station UE, the radio base station eNB#1, and the gateway apparatus S-GW in this order to a path of the mobile station UE, the radio base station eNB#2, the radio base station eNB#1, and the gateway apparatus S-GW in this order.

Furthermore, when the X2 handover processing from the cell #2 under the radio base station eNB#2 to the cell #3 under the radio base station eNB#3 is performed on the mobile station UE, a forwarding path of the downlink user data is switched from a path of the gateway apparatus S-GW, the radio base station eNB#1, the radio base station eNB#2, and the mobile station UE in this order to a path of the gateway apparatus S-GW, the radio base station eNB#1, the radio base station eNB#3, and the mobile station UE in this order, and a forwarding path of uplink user data is switched from a path of the mobile station UE, the radio base station eNB#2, the radio base station eNB#1, and the gateway apparatus S-GW in this order to a path of the mobile station UE, the radio base station eNB#3, the radio base station eNB#1, and the gateway apparatus S-GW in this order.

Figure 2:
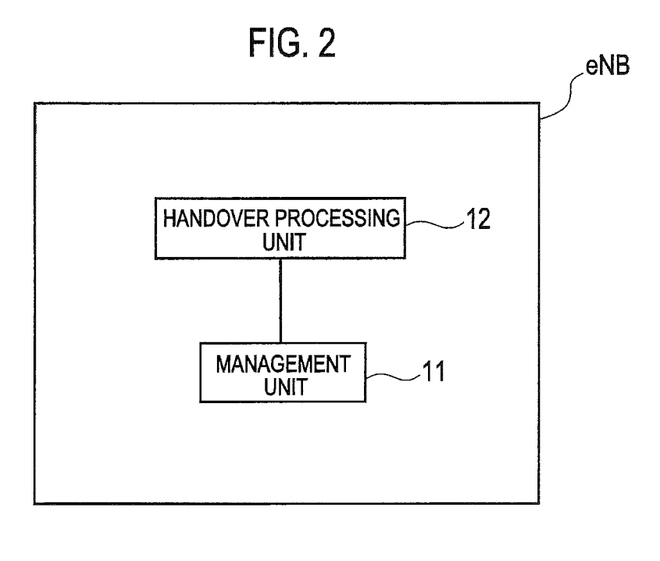
FIG. 2 is a functional block diagram of a radio base station according to the first embodiment of the present invention.

The configurations of the radio base stations eNB#1 to eNB#3 are basically same, and they will be described as the configuration of the radio base station eNB. As illustrated in FIG. 2, the radio base station eNB according to the present embodiment includes a management unit 11 and a handover processing unit 12.

The management unit 11 is configured to manage "Virtual eNB ID" of the radio base station eNB.

Also, the management unit 11 may manage "NRT (Neighbour Relation Table)" including information on a neighbor radio base station eNB.

The handover processing unit 12 is configured to perform handover processing (such as X2 handover processing or S1 handover processing) on the mobile station UE in a cell under the radio base station eNB.

Figure 3:
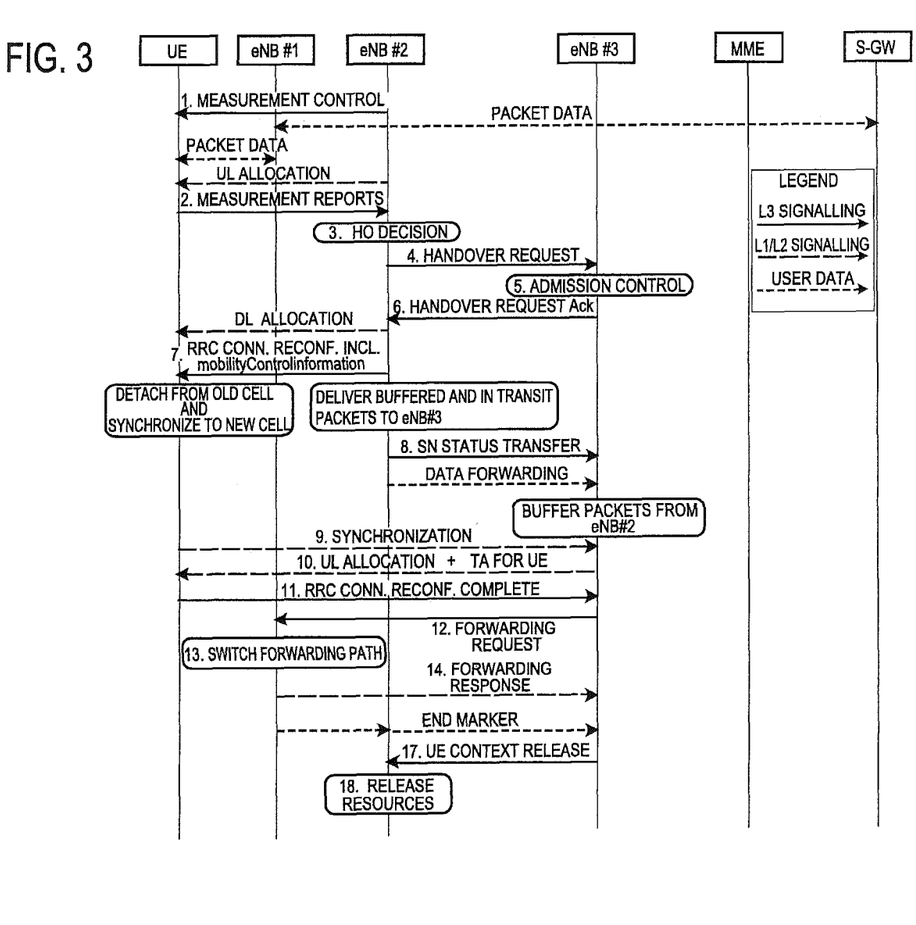
FIG. 3 is a sequential diagram illustrating an operation of the mobile communication system according to the first embodiment of the present invention.

Described hereinafter by referring to FIG. 3 is an operation which is performed in the mobile communication system according to the present embodiment when the mobile station UE performs handover from the cell #2 under the radio base station eNB#2 to the cell #3 under the radio base station eNB#3.

As illustrated in FIG. 3, when the mobile station UE is in "RRC_Connected state" in the cell #2 under the radio base station eNB#2, the radio base station eNB#1 forwards the downlink user data (packet data) addressed to the mobile station UE, which is received from the gateway apparatus S-GW, to the radio base station eNB#2, and the radio base station eNB#2 transmits the downlink user data addressed to the mobile station UE to the mobile station UE.

Also, in such a case, the radio base station eNB#2 forwards the uplink user data (packet data) for the mobile station UE, which is received from the mobile station UE, to the radio base station eNB#1, and the radio base station eNB#1 forwards the uplink user data for the mobile station UE, which is received from the radio base station eNB#2, to the gateway apparatus S-GW.

At step 1, the radio base station eNB#2 transmits "Measurement Control" to the mobile station UE.

At step 2, the mobile station UE performs measurement processing based on the "Measurement Control" and transmits "Measurement Report" including a measurement result to the radio base station eNB#2.

At step 3, the radio base station eNB#2 determines to perform handover processing on the mobile station UE from the cell #2 to the cell #3 based on the "Measurement Report." At step 4, the radio base station eNB#2 transmits "Handover Request" through an X2 interface to the radio base station eNB#3.

FIG. 4 illustrates one example of a format of the "Handover Request."

As illustrated in FIG. 4, the "Handover Request" notifies of identification information (Global eNB ID) of the radio base station eNB#1, which is in charge of forwarding the user data (U-plane data) for the mobile station UE, by an information element "Anchor eNB ID."

At step 5, the radio base station eNB#3 performs "Admission Control" in response to the "Handover Request."

Here, when determining to accept an access in the "Admission Control," the radio base station eNB#3 transmits "Handover Request Ack" to the radio base station eNB#2 at step 6.

At step 7, the radio base station eNB#2 transmits "RRC Connection Reconfiguration" including "mobilityControlinformation" by using a radio resource (PDSCH: Physical Downlink Shared Channel) allocated by "DL allocation" to the mobile station UE in response to the "Handover Request Ack."

The mobile station UE switches a cell to receive the downlink user data from the cell #2 to the cell #3 in response to the "mobilityControlinformation."

On the other hand, at step 8, the radio base station eNB#2 forwards the buffering downlink data addressed to the mobile station UE and also transmits "SN status Transfer" to the radio base station eNB#3, and the radio base station eNB#3 buffers the forwarded downlink data addressed to the mobile station UE.

At step 9, the mobile station UE transmits "Synchronisation" to the radio base station eNB#3. At step 10, the radio base station eNB#3 allocates a radio resource (PUSCH: Physical Uplink Shared Channel) for uplink user data transmission by "UL allocation" and transmits "TA (Timing Advance) message" for the mobile station UE to the mobile station UE.

At step 11, the mobile station UE transmits "RRC Connection Reconfiguration Complete" to the radio base station eNB#3 by using the radio resource allocated by the "UL allocation."

Here, the mobile station UE switches a cell, in which the uplink user data is transmitted, from the cell #2 to the cell #3. Hereinafter, the forwarding path for the uplink user data becomes a path of the mobile station UE, the radio base station eNB#3, the radio base station eNB#1, and the gateway apparatus S-GW in this order.

At step 12, the radio base station eNB#3 transmits "Forwarding Request" to the radio base station eNB#1 in response to the "RRC Connection Reconfiguration Complete."

Figure 5:
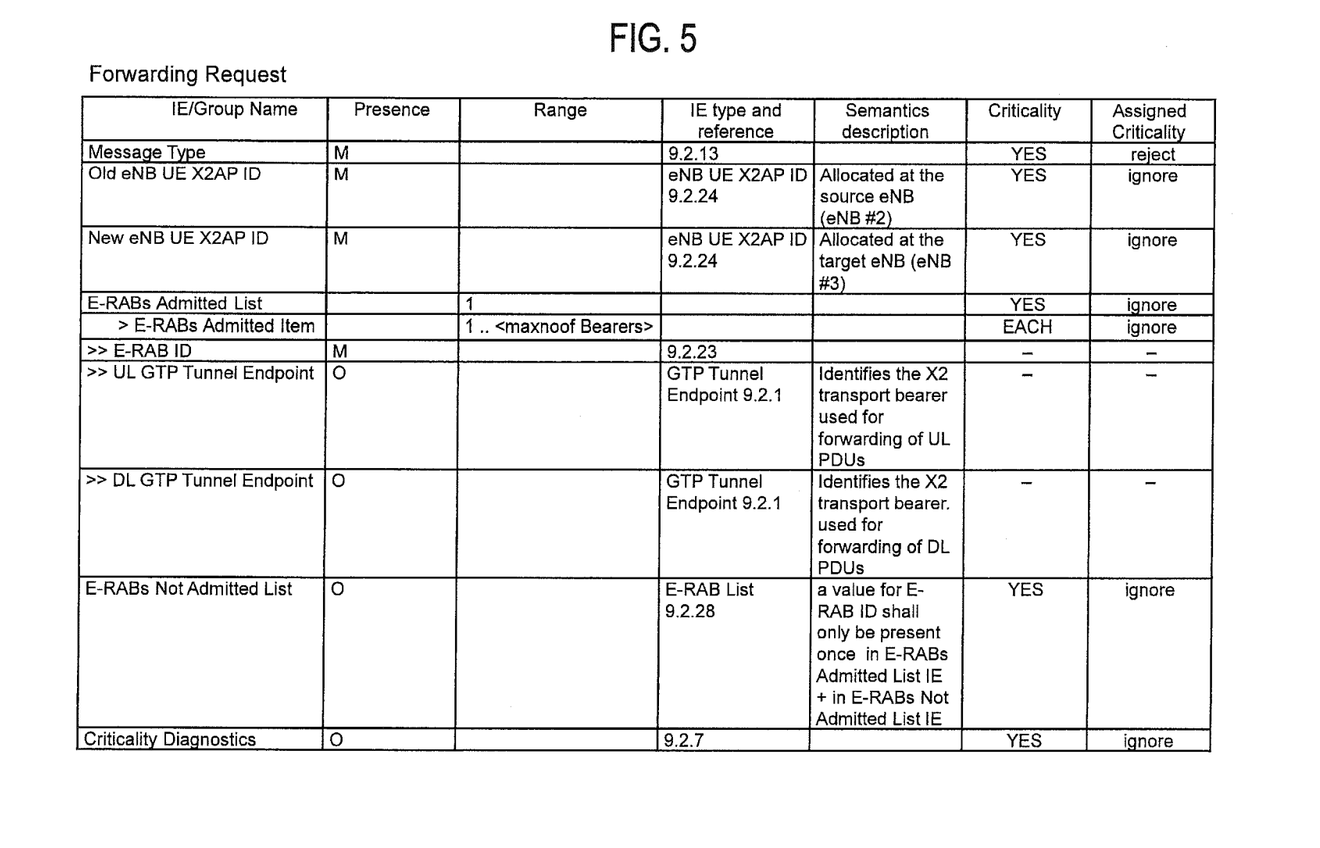
FIG. 5 is a diagram illustrating one example of a format of "Forwarding Request" which is used in the mobile communication system according to the first embodiment of the present invention.

FIG. 5 illustrates one example of a format of the "Forwarding Request."

As illustrated in FIG. 5, the "Forwarding Request" notifies of identification information of the radio base station eNB, which is in charge of forwarding the downlink user data (U-plane data) for the mobile station UE, by an information element "Old eNB UE X2AP ID", and notifies of identification information of the radio base station eNB which thereafter should be in charge of forwarding the downlink user data (U-plane data) for the mobile station UE by an information element "New eNB UE X2AP ID."

It is to be noted that the "Forwarding Request" may be transmitted at any timing of step 4 or later.

At step 13, the radio base station eNB#1 switches the radio base station eNB in charge of forwarding the downlink user data (U-plane data) for the mobile station UE from the radio base station eNB#2 to the radio base station eNB#3. At step 14, the radio base station eNB#1 transmits "Forwarding Response" to the radio base station eNB#3.

Figure 6:
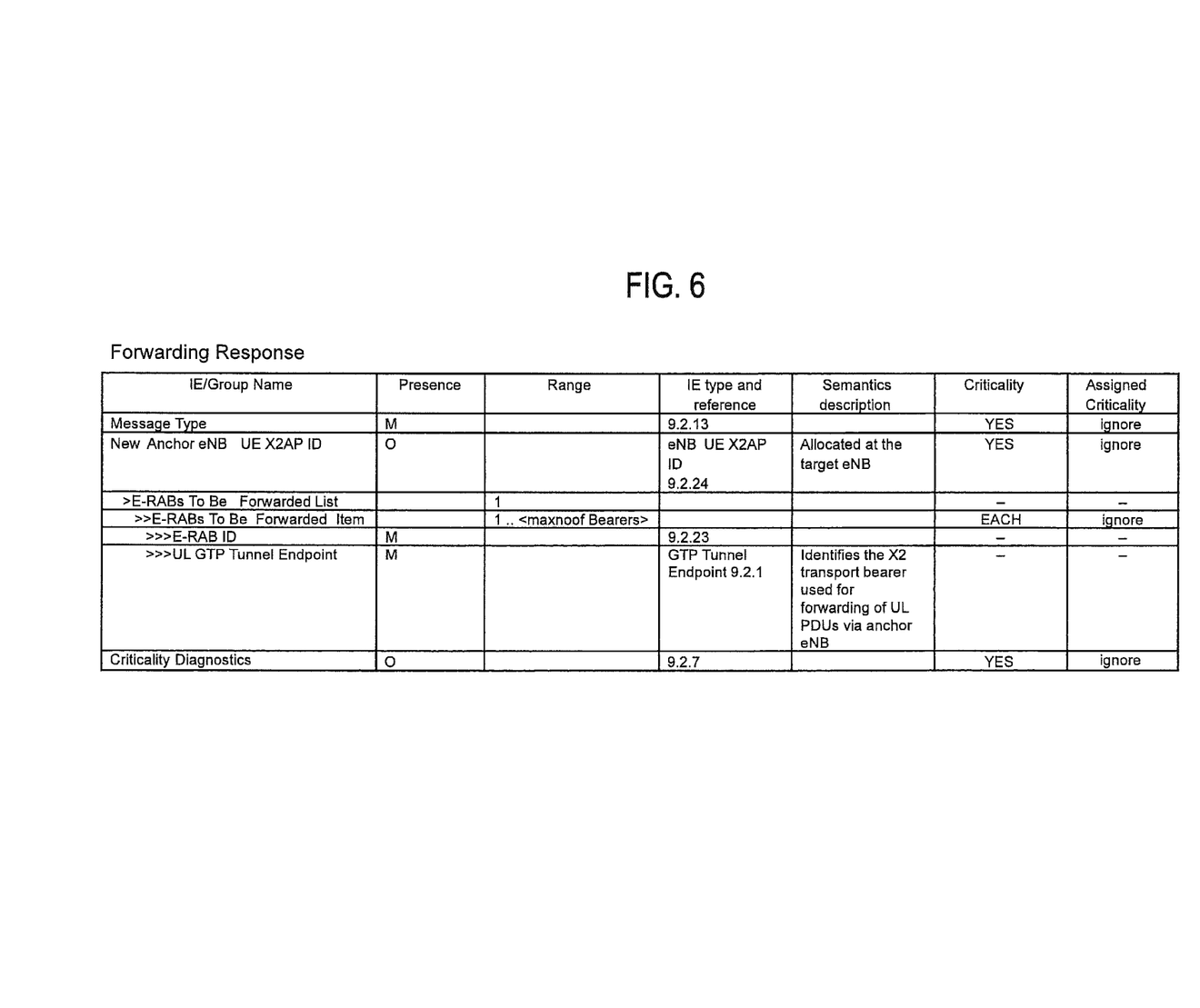
FIG. 6 is a diagram illustrating one example of a format of "Forwarding Response" which is used in the mobile communication system according to the first embodiment of the present invention.

FIG. 6 illustrates one example of a format of the "Forwarding Response."

As illustrated in FIG. 6, the "Forwarding Response" notifies of own identification information as identification information of the radio base station eNB in charge of forwarding the downlink user data (U-plane data) for the mobile station UE by an information element "New Anchor eNB UE X2AP ID."

When the forwarding of the downlink user data (U-plane data) for the mobile station UE is completed, the radio base station eNB#1 transmits "End Marker" indicating the completion to the radio base station eNB#2. When the forwarding of the downlink user data (U-plane data) for the mobile station UE is completed, the radio base station eNB#2 transmits "End Marker" indicating the completion to the radio base station eNB#3.

Hereinafter, the forwarding path of the downlink user data addressed to the mobile station UE becomes a path of the gateway apparatus S-GW, the radio base station eNB#1, the radio base station eNB#3, and the mobile station UE in this order.

At step 17, the radio base station eNB#3 transmits "UE Context Release" requesting to release context information for the mobile station UE (UE Context) to the radio base station eNB#2.

At step 18, the radio base station eNB#2 releases the context information (UE Context) for the mobile station UE in response to the "UE Context Release."

The features of the present embodiment may also be expressed as follows.

A first feature of the present embodiment is summarized as a mobile communication method, including the steps of: in a state where a radio base station eNB#1 (first radio base station) forwards downlink user data (packet data) addressed to a mobile station UE, which is received from a gateway apparatus S-GW, to a radio base station eNB#2 (second radio base station) and the radio base station eNB#2 transmits the downlink user data addressed to the mobile station UE to the mobile station UE, determining, by the radio base station eNB#2, to perform handover processing for the mobile station UE from a cell #2 under the radio base station eNB#2 to a cell #3 under a radio base station eNB#3 (third radio base station); transmitting "Handover Request (handover request signal)" to the radio base station eNB#3 from the radio base station eNB#2, the "Handover Request" notifying that forwarding of the downlink user data addressed to the mobile station UE from the radio base station eNB#1 to the radio base station eNB#2 is ongoing; transmitting, by the radio base station eNB#3, "Forwarding Request (forwarding request signal)" for the downlink user data addressed to the mobile station UE, to the radio base station eNB#1; in response to the "Forwarding Request", switching, by the radio base station eNB#1, a forwarding destination of the downlink user data addressed to the mobile station UE, which is received from the gateway apparatus S-GW, from the radio base station eNB#2 to the radio base station eNB#3; and transmitting, by the radio base station eNB#3, the downlink user data addressed to the mobile station UE, which is received from the radio base station eNB#1, to the mobile station UE.

With the above-described configuration, the radio base station eNB#3 transmits the "Forwarding Request" to the radio base station eNB#1, so that the radio base station eNB#1 switches a forwarding destination of the downlink user data addressed to the mobile station UE from the radio base station eNB#2 to the radio base station eNB#3. Even when an operation is performed in such a manner that the "Path Switch" is not performed when the X2 handover processing is performed, the downlink user data can be properly transmitted to the mobile station UE without increasing the number of radio base stations eNB through which the downlink user data addressed to the mobile station UE passes.

In the first feature of the present embodiment, the mobile communication method may include the step of forwarding, by the radio base station eNB#2, the downlink user data addressed to the mobile station UE, which is received from the radio base station eNB#1 and is buffered, to the radio base station eNB#3, after the radio base station eNB#2 receives "Handover Request Ack (response signal)" to the "Handover Request" from the radio base station eNB#3.

With the above-described configuration, when the X2 handover is performed, the downlink user data addressed to the mobile station UE can be transmitted to the mobile station UE without being lost.

In the first feature of the present embodiment, the mobile communication method may include the steps of: after the radio base station eNB#1 switches the forwarding destination of the downlink user data addressed to the mobile station UE, transmitting, by the radio base station eNB#1, "End Marker (indication information)" to the radio base station eNB#3, the "End Marker" indicating the switching of the forwarding destination; and in response to the "End Marker", transmitting, by the radio base station eNB#3, "UE Context Release (signal)" requesting to release context information on the mobile station UE to the radio base station eNB#2.

With the above-described configuration, when the X2 handover processing is performed, the context information on the mobile station UE is released, so that useless resource utilization can be avoided in the radio base station eNB#2 off the forwarding path of the user data for the mobile station UE.

In the first feature of the present embodiment, in the state, the radio base station eNB#2 forwards uplink user data for the mobile station UE, which is received from the mobile station UE, to the radio base station eNB#1, the radio base station eNB#1 forwards the uplink user data for the mobile station UE, which is received from the radio base station eNB#2, to the gateway apparatus S-GW. Here, the mobile communication method may include the steps of: after the radio base station eNB#2 receives "Handover Request Ack" to the "Handover Request" from the radio base station eNB#3, transmitting, by the radio base station eNB#2, "mobilityControlinformation (switching request signal)" from a cell #2 under the radio base station eNB#2 to a cell #3 under the radio base station eNB#3, to the mobile station UE; and switching, by the mobile station UE, a transmission destination of the uplink user data for the mobile station UE from the radio base station eNB#2 to the radio base station eNB#3 in response to the "mobilityControlInformation."

With the above-described configuration, when the X2 handover processing is performed, the uplink user data can be properly forwarded to the gateway apparatus S-GW without increasing the number of radio base stations eNB through which the uplink user data for the mobile station UE passes.

It should be noted that the foregoing operations of the mobile stations UE, the radio base station eNB, the mobility management node MME, and the gateway apparatus S-GW may be implemented by hardware, may be implemented by a software module executed by a processor, or may be implemented in combination of the two.

The software module may be provided in a storage medium in any format, such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to a processor so that the processor can read and write information from and to the storage medium. Instead, the storage medium may be integrated in a processor. The storage medium and the processor may be provided inside an ASIC. Such an ASIC may be provided in the mobile stations UE, the radio base station eNB, the mobility management node MME, and the gateway apparatus S-GW. Otherwise, the storage medium and the processor may be provided as discrete components inside the mobile stations UE, the radio base station eNB, the mobility management node MME, and the gateway apparatus S-GW.

Hereinabove, the present invention has been described in detail by use of the foregoing embodiments. However, it is apparent to those skilled in the art that the present invention should not be limited to the embodiments described in the specification. The present invention can be implemented as an altered or modified embodiment without departing from the spirit and scope of the present invention, which are determined by the description of the scope of claims. Therefore, the description of the specification is intended for illustrative explanation only and does not impose any limited interpretation on the present invention.

Note that the entire content of Japanese Patent Application No. 2012-212961 (filed on Sep. 26, 2012) is incorporated by reference in the present specification.

INDUSTRIAL APPLICABILITY

As described above, the present invention can provide a mobile communication method, in which when an operation is performed in such a manner that "Path Switch" is not performed when X2 handover processing is performed, downlink user data addressed to a mobile station can be properly transmitted to the mobile station without increasing the number of radio base stations through which the downlink user data passes.

EXPLANATION OF REFERENCE NUMERALS

S-GW gateway apparatus
MME mobility management node
eNB#1 to eNB#4 radio base station
UE mobile station
11 management unit
12 handover processing unit

The invention claimed is:

1. A mobile communication method, comprising the steps of:
in a state where a first radio base station forwards downlink user data addressed to a mobile station, which is received from a gateway apparatus, to a second radio base station and the second radio base station transmits the downlink user data addressed to the mobile station to the mobile station,
determining, by the second radio base station, to perform handover processing for the mobile station from a cell under the second radio base station to a cell under a third radio base station;
transmitting, by the second radio base station, a handover request signal to the third radio base station, the handover request signal notifying that forwarding of the downlink user data addressed to the mobile station from the first radio base station to the second radio base station is ongoing;
transmitting, by the third radio base station, a forwarding request signal for the downlink user data addressed to the mobile station, to the first radio base station;
in response to the forwarding request signal, switching, by the first radio base station, a forwarding destination of the downlink user data addressed to the mobile station, which is received from the gateway apparatus, from the second radio base station to the third radio base station; and
transmitting, by the third radio base station, the downlink user data addressed to the mobile station, which is received from the first radio base station, to the mobile station.

2. The mobile communication method according to claim 1, further comprising the step of forwarding, by the second radio base station, the downlink user data addressed to the mobile station, which is received from the first radio base station and is buffered, to the third radio base station, after the second radio base station receives a response signal to the handover response signal from the third radio base station.

3. The mobile communication method according to claim 1, further comprising the steps of:
after the first radio base station switches the forwarding destination of the downlink user data addressed to the mobile station, transmitting, by the first radio base station, indication information to the third radio base station, the indication information indicating the switching of the forwarding destination; and
in response to the indication information, transmitting, by the third radio base station, a signal requesting to release context information on the mobile station to the second radio base station.

4. The mobile communication method according to claim 1, further comprising the steps of:
in a state where the second radio base station forwards uplink user data for the mobile station, which is received from the mobile station, to the first radio base station, and the first radio base station forwards the uplink user data for the mobile station, which is received from the second radio base station, to the gateway apparatus,
after the second radio base station receives a response signal to the handover request signal from the third radio base station, transmitting, by the second radio base station, a switching request signal from a cell under the second radio base station to a cell under the third radio base station, to the mobile station; and
switching, by the mobile station, a transmission destination of the uplink user data for the mobile station from the second radio base station to the third radio base station in response to the switching request signal.

* * * * *